3,595,877
2-OXA-STEROID AND THE PRODUCTION THEREOF

Robert Bucourt and Lucien Nedelec, Clichy-sous-Bois, France, assignors to Roussel-UCLAF, Paris, France
No Drawing. Filed Aug. 14, 1968, Ser. No. 752,467
Claims priority, application France, Aug. 17, 1967, 118,090, 118,091; Dec. 7, 1967, 131,343; Mar. 7, 1968, 142,767
Int. Cl. C07d 7/20
U.S. Cl. 260—343.2       11 Claims

ABSTRACT OF THE DISCLOSURE 2-oxa-13β-R-17α-methyl-Δ$^{4,9,11}$-gonatrienes of the formula

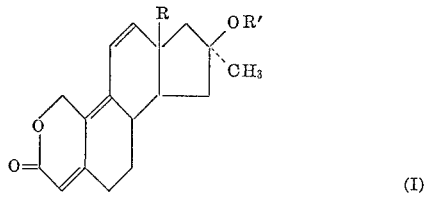

(I)

wherein R is selected from the group consisting of methyl and ethyl and R' is selected from the group consisting of hydrogen, saturated alkyl of 1 to 5 carbon atoms which may contain a hetero oxygen atom, unsaturated alkyl of 2 to 5 carbon atoms, cycloalkyl of 3 to 5 carbon atoms which may contain a hetero oxygen atom, with the proviso that R is ethyl when R' is hydrogen which compounds possess anabolic and androgenic activity. The invention also relates to a novel process and novel intermediates for the preparation of the compounds of Formula I.

OBJECTS OF THE INVENTION

It is an object of the invention to provide novel 2-oxa steroids of Formula I.

It is another object of the invention to provide a novel process and novel intermediates for the 2-oxa-steroids of Formula I.

It is an additional object of the invention to provide novel anabolic and androgenic compositions.

It is a further object of the invention to provide a method of inducing anabolic activity in warm-blooded animals, particularly humans.

These and other objects and advantages of the invention will become obvious from the following detailed description.

THE INVENTION

The novel products of the invention are 2-oxa-17α-methyl-Δ$^{4,9,11}$-gonatrienes of the formula

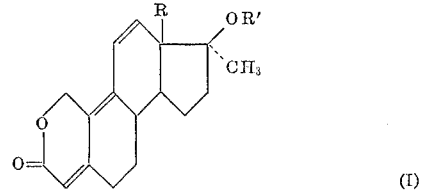

(I)

wherein R is selected from the group consisting of methyl and ethyl and R' is selected from the group consisting of hydrogen, saturated alkyl of 1 to 5 carbon atoms which may contain a hetero oxygen atom, unsaturated alkyl of 2 to 5 carbon atoms, cycloalkyl of 3 to 5 carbon atoms which may contain a hetero oxygen atom, with the proviso that R is ethyl when R' is hydrogen. Two preferred compounds of Formula I are 2-oxa-17α-methyl-17β-(2'-tetrahydropyranyl)-oxy-Δ$^{4,9,11}$-estratriene-3-one and 2-oxa-13β-ethyl-17α-methyl-Δ$^{4,9,11}$-gonatriene-17β-ol-3-one.

The novel process of the invention for the preparation of 2-oxa-17α-methyl-Δ$^{4,9,11}$-gonatrienes of Formula I comprises oxidizing 13β - R - desA-Δ$^9$-gonaene-17β-ol-5-one where R has the above definition to form 13β-R-desA-Δ$^9$-gonaene-5,17-dione, reacting the latter with a secondary amine of the formula

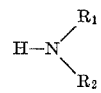

wherein $R_1$ and $R_2$ are alkyl of 1 to 6 carbon atoms and together with the nitrogen atom to which they are attached form a substituted or unsubstituted heterocyclic ring which may contain an additional nitrogen or oxygen hetero atom to form the corresponding 5-enamino-13β-R-desA-Δ$^{5(10), 9(11)}$-gonadiene-17-one, reacting the latter with a methylating agent to form the corresponding 5-enamino-13β-R-17α-methyl - desA-Δ$^{5(10), 9(11)}$-gonadiene-17β-ol, reacting the latter with acetoformic mixed anhydride to form 10-hydroxymethylene-13β-R-17α-methyl-desA-Δ$^{9(11)}$-gonaene-17β-ol-5-one, dehydrogenating the latter with a substituted p-benzoquinone to form the corresponding 10-formyl-13β-R-17α-methyl-desA-Δ$^{9,11}$-gonadiene-17β-ol-5-one, reducing the latter with an alkali metal borohydride to form the corresponding 10-hydroxymethyl-13β-R-17α-methyl - desA - Δ$^{9,11}$-gonadiene-17β-ol-5-one, reacting the latter with dihydropyran to form 10-tetrahydropyranyloxymethyl-13β - R - 17α-methyl-17β-tetrahydropyranyloxy-desA-Δ$^{9,11}$-gonadiene-5-one, subjecting the latter to the Reformatzky reaction with ethyl bromoacetate to form 5-carbethoxymethyl-10-tetrahydropyranyloxymethyl-13β-R-17α - methyl-17β-tetrahydropyranyloxy-desA-Δ$^{9,11}$-gonadiene-5-ol and subjecting the latter to acid treatment to form 2-oxa-13β-R-17α-methyl-Δ$^{4,9,11}$-gonatriene-17β-ol-3-one which may be etherified in the 17β-hydroxyl position. The reaction is illustrated in the following flow sheet.

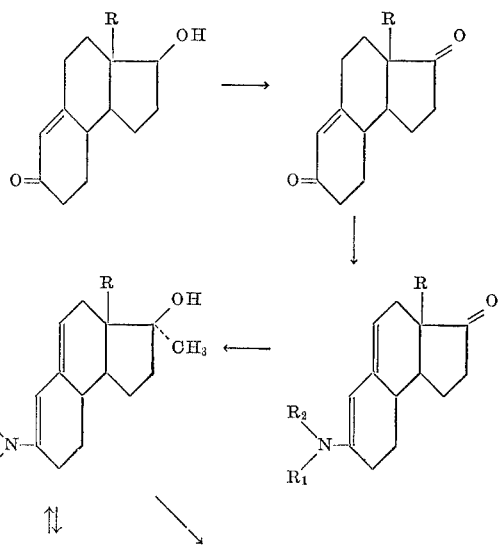

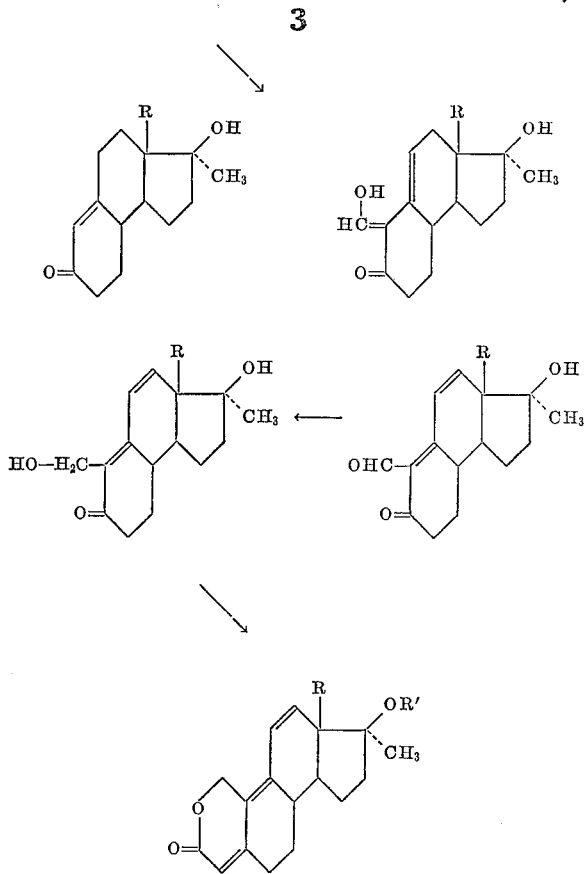

wherein R, R′, $R_1$ and $R_2$ have the above definitions.

Among the preferred process modifications are the use of sulfo-chromic acid in acetone as the oxidizing agent and the secondary amine is diethyl amine, pyrrolidine, piperidine and morpholine. The methylating agent may be methyl lithium or methyl magnesium bromide, chloride or iodide.

Suitable p-benzoquinones are dihalo-dicyano-p-benzoquinone such as 2,3-dicyano-5,6-dichloro-p-benzoquinone. The tetrahydropyranyl ethers may be formed in ether in the presence of an acid catalyst such as p-toluene sulfonic acid. The Reformatzky reaction is preferably effected in a mixture of dimethoxymethane and tetrahydrofuran and the acid treatment is preferably effected with a mixture of hydrochloric acid and acetic acid.

The compounds of Formula I have a high anabolic and androgenic activity in animals greater than known 2-oxa-13β-R-Δ$^{4,9,11}$-gonatrienes. In animals their superiority is several times that of other trienic or 2-oxa-steroids and is manifested on the genital organs and on the muscles.

However, clinical data in human therapy has shown that these compounds lack noticeable effects on the genital organs at the doses used. Moreover, administration at the very weak doses used, while bringing about a rapid and considerable increase in weight, does not bring any increase in the content of seral transaminases. The advantage of these compounds thus rests in the fact that it is possible to find very weak doses already definitely active and nevertheless not manifesting any hepatic toxicity. The clinical studies in human therapy have shown that these products can be administered in a discontinuous manner as a result of a prolonged effect on the anabolism.

In other words, the said compounds of the invention are useful for the treatment of disturbances of protein anabolism, asthenia, wastings, osteoporosis, andropause, senescence, delays in the mending of fractures, metabolic disturbances of prolonged corticotherapy, adiposogenital syndrome, functional menometrorrhagias, fibromas, endometriosis, and as scarring agents for sores or varicose ulcers.

The anabolic compositions of the invention are comprised of an effective amount of at least one 2-oxa-13β-R-17α-methyl-Δ$^{4,9,11}$-gonatriene of Formula I and a major amount of a pharmaceutical carrier. The compositions may be in the form of drinkable or injectable solutions or suspensions, implants, tablets, coated tablets, soft capsules, sublingual tablets, capsules, granules, emulsions, suppositories, syrups, ointments, creams and topical powders prepared in the usual manner. The usual effective individual dose is 0.2 to 5.0 mg. per day in the adult.

The novel method of inducing anabolic activity in warm-blooded animals and humans comprises administering to said animals or humans an effective amount of at least one 2-oxa-13β-R-17α-methyl-Δ$^{4,9,11}$-gonatriene of Formula I. The said compounds may be administered orally, perlingually, transcutaneously, rectally or topically on skin or mucosa. The usual useful daily dosage is 5 μg. to 85 μg./kg. depending upon the method of administration and the specific compound.

In the following examples there are described several preferred embodiments to illustrate the invention. However, it should be understood that the invention is not intended to be limited to the specific embodiments.

EXAMPLE I

Preparation of 2-oxa-17α-methyl-17β-(2′-ξ-tetrahydropyranyl)-oxy-Δ$^{4,9,11}$-estratriene-3-one Step A.—5-pyrrolidyl-des A-Δ$^{5(10),9(11)}$-estradiene-17-one: 100 gm. of des A-Δ$^9$-estraene-5,17-dione (described in U.S. Pat. No. 3,150,152), was suspended in 500 cc. of methanol and 52.5 cc. of pyrrolidine was added thereto under nitrogen and with stirring at 20° C. The mixture was agitated for one hour and then was filtered. The precipitate was washed with methanol and dried in vacuo to obtain 116.3 gm. (93.5% yield) of 5-pyrrolidyl-des A-Δ$^{5(10),9(11)}$-estradiene-17-one having a melting point of 144–145° C.

The product occurred in the form of yellow needles which were soluble in ether, benzene, acetone and chloroform, slightly soluble in alcohol and insoluble in water.

Infra-red spectrum (chloroform):
Presence of enamine at 1622 cm.$^{-1}$ and 1593 cm.$^{-1}$.
Ultraviolet spectrum (ether):
λmax. at 281 mμ ε=25,400

Step B.—5-pyrrolidyl - 17α - methyl-des A-Δ$^{5(10),9(11)}$-estradiene-17β-ol: A solution of 116 gm. of 5-pyrrolidyl-des A-Δ$^{5(10),9(11)}$-estradiene-17-one in 560 cc. of tetrahydrofuran was added to 2.45 liters of 1.22 N ethereal solution of methyl lithium at 0+5° C. and the mixture was then agitated for three hours at that temperature. Then the reaction mixture was poured into a solution of water, ice and NH$_4$Cl and the mixture was extracted with ethyl ether. The extracts were combined, washed with water, added to 2 liters of methylene chloride, dried over sodium sulfate and evaporated to dryness in vacuo to obtain 117.70 gm. of 5-pyrrolidyl-17α-methyl-des A-Δ$^{5(10),9(11)}$-estradiene-17β-ol which was used as such for the next step.

For analysis the product was purified by recrystallization in petroleum ether and had a melting point of 115–118° C. The product occurred in the form of a solid orange-yellow product, soluble in alcohol, acetone, benzene and chloroform, slightly soluble in ether and insoluble in water.

Infrared spectrum (chloroform):

Presence of conjugated C=C at 1626 cm.$^{-1}$ and 1598 cm.$^{-1}$.

As far as is known, this compound is not described in the literature.

Step C.—10-hydroxymethylene - 17α - methyl-des A-Δ$^{9(11)}$-estraene-17β-ol-5-one: 112 cc. of triethylamine were added to a solution of 117 gm. of the pyrrolidyl enamine of Step B in 1170 cc. of tetrahydrofuran and after adjusting the temperature to −10° C., 285 cc. of mixed formic-acetic acid anhydride obtained from sodium formate and acetyl chloride were added thereto. The mixture was agitated for 15 minutes, then maintained at 0° C. for one hour and then at 10° C. for one hour. 465 cc. of water were then added to the mixture and the temperature was raised to room temperature. After being agitated overnight, the mixture was poured into a water-ice mixture and extracted with ether. The ether phase was washed with water and then with ice-cooled aqueous solution of 5% sodium bicarbonate. The ether phase was then extracted with 0.5 N sodium hydroxide and after the addition of 1400 cc. of ice cooled 2 N hydrochloric acid to the alkaline phase, the precipitate formed was dissolved in ether. The ether was washed with ice-cooled water, with ice-cooled aqueous solution of 2% sodium bicarbonate and then with water, 2 liters of methylene chloride were added to the ether phase and the organic phase was dried over sodium sulfate and evaporated to dryness in vacuo to obtain 55.8 gm. of crude 10-hydroxymethylene-17α-methyl-des A-Δ$^{9(11)}$-estraene-17β-ol-5-one which is used as such for the next step.

The product occurred in the form of an orange-yellow amorphous product, soluble in dilute aqueous alkalis, alcohol, ether, acetone, benzene and chloroform and insoluble in water.

Ultra-violet spectrum:
 (1) Ethanol—
  λ$_{max.}$ at 233 mμ E$^{1\%}_{1cm.}$=421
  λ$_{max.}$ at 337 mμ E$^{1\%}_{1cm.}$=89
 (2) Ethanol-N/10 caustic soda—
  λ$_{max.}$ at 231 mμ E$^{1\%}_{1cm.}$=324
  λ$_{max.}$ at 259-250 mμ E$^{1\%}_{1cm.}$=350
  λ$_{max.}$ at 347 mμ E$^{1\%}_{1cm.}$=230

As far as is known, this compound is not described in the literature.

Step D.—10-formyl-17α-methyl-des A-Δ$^{9,11}$-estradiene-17β-ol-5-one: 55.80 gm. of 10-hydroxymethylene compound prepared in Step C were dissolved in 560 cc. of dioxane and after cooling the resulting solution to 10° C., a solution of 53.5 gm. of 2,3-dichloro-5,6-dicyano-p-benzoquinone in 550 cc. of dioxane was added thereto. The mixture was held for 45 minutes at 12° C. and then was filtered. The precipitate was washed with ether. The organic phases were poured into a water-ice mixture and the mixture was decanted. The mixture was extracted with methylene chloride and 3 liters of ether were added to the organic extract. The organic phase was washed with ice-cooled aqueous solution of 5% sodium bicarbonate and 1% sodium bisulfite, then with ice-cooled 0.5 N sodium hydroxide and then with ice-cooled water until the wash waters were neutral. The organic phase was then dried over sodium sulfate and evaporated to dryness in vacuo to obtain 20.3 gm. of crude product. The crude product was purified by chromatography on silica gel with elution with 4:6 benzene-ethyl acetate mixture and recrystallization from isopropyl ether containing 10% isopropanol to obtain 5.094 gm. of 10-formyl-17α-methyl-des A-Δ$^{9,11}$-estradiene-17β-ol-5-one having a melting point of 139° C.

The product occurred in the form of yellow prisms soluble in acetone, benzene and chloroform, slightly soluble in ether and insoluble in water.

Analysis.—$C_{16}H_{20}O_3$; molecular weight=260.32. Calculated (percent): C, 73.82; H, 7.74. Found (percent): C, 73.8; H, 7.9.

Infra-red spectrum (chloroform):
 Presence of OH at 3640 cm.$^{-1}$
 Presence of CHO at 2760 cm.$^{-1}$ and 1695 cm.$^{-1}$
 Presence of C=O at 1665 cm.$^{-1}$
 Presence of C=C at 1590 cm.$^{-1}$ and 1540 cm.$^{-1}$ Ultraviolet spectrum (dioxane):
 λ$_{max.}$ at 230 mμ E$^{1\%}_{1cm.}$=190
 λ$_{max.}$ at 307 mμ E$^{1\%}_{1cm.}$=774 say ε=20,150

As far as is known, this compound is not described in the literature.

Step E.—10-hydroxymethyl - 17α - methyl-des A-Δ$^{9,11}$-estradiene-17β-ol-5-one: 3.05 gm. of 10-formyl-17α-methyl-des A-Δ$^{9,11}$-estradiene-17β-ol-5-one were dissolved in 30 cc. of dioxane and 3 cc. of water and after cooling the solution to 5° C., 125 mg. of sodium borohydride were added thereto. The mixture was agitated at 8° C. for 30 minutes and was then poured into an aqueous solution of 20% sodium chloride. The aqueous phase was extracted with methylene chloride and the organic phase was washed with water until neutral, dried over sodium sulfate and evaporated to dryness in vacuo to obtain 3.08 gm. of crude product. The product was purified by chromatography on silica gel with elution with a 5:95 benzene-ethyl acetate mixture to obtain 2.65 gm. (66% yield) of 10-hydroxymethyl-17α-methyl-des A-Δ$^{9,11}$-estradiene-17β-ol-5-one which was used as such for the next step.

Ultraviolet spectrum (ethanol):

Max. at 289–290 Mμ ε=20,400

As far as is known, this compound is not described in the literature.

Step. F.—10-tetrahydropyranyloxymethyl-17α - methyl-17β-tetrahydropyranyloxy-des A-Δ$^{9,11}$-estradiene-5-one: 7.3 gm. of 10-hydroxymethyl-17α-methyl-des A-Δ$^{9,11}$-estradiene-17β-ol-5-one, 7.3 cc. of dihydropyran and 220 mg. of p-toluene sulfonic acid in 370 cc. of ether were mixed and the mixture was stirred for 7½ hours at room temperature under nitrogen. After adding 7.3 cc. of dihydropyran thereto, the reaction was allowed to continue for a total time of 30 hours. The reaction mixture was poured into an aqueous solution of 5% sodium bicarbonat,e was decanated and the aqueous phase was extracted with methylene chloride. The organic phases were combined, washed with water until neutral, dried over sodium sulfate, filtered and evaporated to dryness in vacuo to obtain 12.4 gm. of 10-tetrahydropyranyloxymethyl-17α-methyl-17β-tetrahydropyranyloxy-des A-Δ$^{9,11}$-estradiene-5-one which was used as is for the next step.

For analysis, the product was purified by chromatography on silica gel with elution with 80:20:0.1 mixture of benzene-ethyl acetate-triethylamine.

Ultraviolet spectrum (ethanol):
 λ max. at 289 mμ ε=23,150

As far as is known, this compound is not described in the literature.

Step G.—2-oxa-17α-methyl-Δ$^{4,9,11}$-estratriene-17β-ol - 3-one: 12.4 gm. of 10-tetrahydropyranyloxymethyl - 17α-methyl-17β-tetrahydropyranyloxy-des A-Δ$^{9,11}$ - estradiene-5-one, 11 gm. of zinc and 180 mg. of iodine were introduced under nitrogen into 180 cc. of benzene and one third of a solution of 6.2 cc. of ethyl bromoacetate in 15 cc. of benzene was added to the reaction mixture which was then heated at reflux for 10 minutes. Then the rest of the solution of ethyl bromoacetate was added and reflux was continued for 20 minutes after which the mixture was cooled and filtered. The filtrate was washed with benzene and the combined benzene solutions were poured into a mixture of ice and 2 N hydrochloric acid. The organic phase was decanted off and the aqueous phase was extracted with methyl chloride. The combined organic phases were washed with water until neutral, dried over sodium sulfate, evaporated to dryness in vacuo to obtain 15.4 gm. of crude product. Chromatography on silica gel and elution with a 2:8 ethyl acetate-benzene mixture gave 8 gm. of 5ξ-carbethoxymethyl-10 - tetrahydropyranyloxymethyl-17α-methyl-17β-tetrahydropyranyloxy-des A-$^{9,11}$ - estradiene-5ξ-ol.

Infared spectrum (chloform):
  Presence of associated OH at 3455 cm.$^{-1}$
  Presence of carbonyl at 1720–1708 cm.$^{-1}$
  Band at 1617 cm. $^{-1}$
Ultraviolet spectrum (ethanol):
  $\lambda_{max}$. at 247 m$\mu$ $\epsilon$ = 22,400
  Infl. at about 290 m$\mu$ $E_{1\ cm.}^{1\%}$ = 5

As far as is known, this compound is not described in the literature.

5.6 gm. of the said 5ξ-carbethoxymethyl derivative were then dissolved in 140 cc. of methanol at room temperature under a nitrogen atomsphere and after cooling the solution to 0° C., 14 cc. of hydrochloric acid were added thereto. The mixture was stirred for 1 hour at 0+5° C. and then for 64 hours at room temperature after which the mixture was poured into water. The mixture was extracted with methylene chloride and the combined organic phases were washed with aqueous sodium bicarbonate solution, then with water until neutral, dried over sodium sulfate and evaporated to dryness in vacuo to obtain 3.295 gm. of crude product. Recrystallization from ether and then 1:1 ethyl acetate-ether mixture gave 1.34 gm. of 2-oxa-17α-methyl-$\Delta^{4,9,11}$-estratriene-17β-ol-3-one having a melting point of 148° C. and a specific rotation $[\alpha]_D^{20}$ = —41° ± 1° (c. = 0.5% in chloroform).

The product occurred in the form of colorless needles soluble in alcohol, methylene chloride and ethyl acetate, and insoluble in water.

Analysis.—C$_{18}$H$_{22}$O$_3$; molecular weight = 286.36. Calculated (percent): C, 75.49; H, 7.75. Found (percent): C, 75.56; H, 7.7.

I.R. Spectrum (chloform):
  Presence of OH at 3600 cm. $^{-1}$
  Presence of C=C at 1593 cm. $^{-1}$ and 1562 cm.$^{-1}$
  Presence of complex carbonyl at 1710–1690 cm.$^{-1}$
U.V. Spectrum (ethanol):
  $\lambda_{max}$. at 230 m$\mu$ $E_{1\ cm.}^{1\%}$ = 205
  $\lambda_{max}$. at 327–328 m$\mu$ $E_{1\ cm.}^{1\%}$ = 990 say $\epsilon$ = 28,350

Step H.—2-oxa-17α-methyl-17β-(2'ξ-tetrahydropyranyl) oxy-$\Delta^{4,9,11}$-estratriene-3-one: 0.3 gm. of 2-oxa-17α-methyl-$\Delta^{4,9,11}$-estratriene-17β-ol-3-one was added to a mixture of 0.5 cc. of dihydropyran, 12 mg. of p-toluenesulfonic acid and 5 cc. of ether and the suspension was stirred under nitrogen in the dark during which dissolution rapidly occurred. After stirring for 2½ hours, 0.5 cc. of dihydropyran was added and stirring continued and then 0.5 cc. of dihydropyran was again added. After stirring for 6 hours, the solution was neutralized by the addition of sodium bicarbonate followed by the addition of 2 cc. of water. The mixture was extracted with ether and the ether phase was decanted off and washed with water, dried over sodium sulfate and evaporated to dryness in vacuo. The crude residue was purified by double chromatography on silica gel with elution with benzene-ethyl acetate. By evaporation of the solvent, 0.278 gm. of 2-oxa-17α-methyl-17β-(2ξ-tetrahydropyranyl)oxy-$\Delta^{4,9,11}$-estratriene-3-one spontaneously crystallized.

For analysis, the product was recrystallized by dissolution in 1 cc. of ether followed by addition of 1 cc. of isopropyl ether. The solution was placed overnight in a refrigerator and then filtered. The precipitate was washed with isopropyl ether and dried to obtain the product having a melting point of 125° C. and a specific rotation $[\alpha]_D^{20}$ = —22° ± 2° (c. = 0.6% in chloroform). The product occurred in the form of pale yellow crystals soluble in alcohol, benzene, chloroform and ether, fairly soluble in olive oil and insoluble in water.

Analysis.—C$_{23}$H$_{30}$O$_4$; molecular weight = 370.50. Calculated (percent): C, 74.56; H, 8.16. Found (percent): C, 74.6; H, 8.1.

U.V. Spectrum (ethanol):
  $\lambda_{max}$. 230–231 m$\mu$ $\epsilon$ = 6,065
  $\lambda_{max}$. 326–327 m$\mu$ $\epsilon$ = 27,900
I.R. Spectrum (chloroform):
  Presence of trienic lactone
  Presence of the C—O—C group
  Absence of hydroxyl 2-oxa - 17α - methyl-17β-(2'ξ-tetrahydropyranyl)-oxy-$\Delta^{4,9,11}$-estratriene-3-one, as far as is known, is not described in the literature.

EXAMPLE II

Preparation of 2-oxa-13β-ethyl-17α-methyl-$\Delta^{4,9,11}$-gonatriene-17β-ol-3-one Step A.—13β-ethyl-des-A-$\Delta^9$-gonaene-5,17-dione: 25.04 gm. of 13β-ethyl-des A-$\Delta^9$-gonaene-17β-ol-5-one having a melting point of 153° C. (described in French Pat. No. 1,526,963) were dissolved in 370 cc. of acetone at room temperature and after cooling the solution to 5° C., 50 cc. of sulfochromic solution was added thereto over an hour while constantly keeping the temperature at about 5° C. The mixture was stirred for 30 minutes at this temperature after which water was added and the solution stood at room temperature for 30 minutes. The reaction mixture was extracted with methylene chloride and the extracts were washed with water, dried, and evaporated to dryness in vacuo. The residue was recrystallized from a mixture of isopropyl ether and ethyl ether to obtain 20 gm. (80% yield) of 13β-ethyl-des A-$\Delta^9$-gonaene-5,17-dione having a melting point of 108° C. and a specific rotation $[\alpha]_D^{20}$ = +25° (c. = 0.6% in chloroform). The product occurred as colorless crystals soluble in chloroform, ether, methanol and ethanol.

Analysis.—C$_{15}$H$_{20}$O$_2$; molecular weight = 232.31. Calculated (percent): C, 77.55; H, 8.68. Found (percent): C, 77.3; H, 8.8.

As far as is known, this product is not described in the literature.

Step B.—5-pyrrolidyl-13β-ethyl-des A-$\Delta^{5(10),9(11)}$-gonadiene-17-one: 15.55 gm. of 13β-ethyl-des A-$\Delta^9$-gonaene-5,17-dione were dissolved in 150 cc. of methanol under a nitrogen atmosphere and after heating the solution to 50° C., a mixture of 6 cc. of pyrrolidine and 6 cc. of methanol was added dropwise in 20 minutes. The reaction mixture was held at 50° C. for another 15 minutes and then distilled to dryness in vacuo to obtain 5-pyrrolidyl - 13β - ethyl-des A-$\Delta^{5(10),9(11)}$-gonadiene-17-one which is used as such for the next step.

As far as is known, this compound is not described in the literature.

Step C.—5-pyrrolidyl - 13β - ethyl-17α-methyl-des A-$\Delta^{5(10),9(11)}$-gonadiene-17β-ol: The 5-pyrrolidyl from Step B was dissolved in 100 cc. of tetrahydrofuran and 420 cc. of 2 N methyl lithium ethereal solution were added dropwise over 30 minutes under a nitrogen atmosphere at an internal temperature of 10° C. The solution was then refluxed for 3 hours and after cooling, the reaction mixture was poured into an ice-water mixture and extracted with ether. The ether extracts were washed with water, dried and evaporated to dryness in vacuo to obtain 5-pyrrolidyl-13β-ethyl-17α-methyl-des A-Δ$^{5(10),9(11)}$-gonadiene-17β-ol, which was used as such for the next step.

As far as is known, the compound is not described in the literature.

Step D.—13β-ethyl-17α-methyl-des A-Δ$^9$-gonaene-17β-ol-5-one: The 17α-methyl product of Step C was dissolved in 30 cc. of acetic acid and 200 cc. of water were added to the solution which was stirred overnight at room temperature. Then, the reaction mixture was made alkaline by the addition of 2 N sodium hydroxide and the mixture was extracted with methylene chloride. The extracts were washed with water, with hydrochloric acid, then with water, was filtered and evaporated to dryness in vacuo. The residue was purified by chromatography on magnesium silicate and elution with ether to obtain 7.5 gm. of 13β-ethyl-17α-methyl-des A-Δ$^9$-gonaene-17β-ol-5-one having a melting point of 127–128° C. and a specific rotation of $[\alpha]_D^{20}=-88°$ (c.=0.5% in chloroform). The colorless product was soluble in ether, alcohol, chloroform and acetone.

Analysis.—$C_{16}H_{24}O_2$; molecular weight=248.35. Calculated (percent): C, 77.37; H, 9.74. Found (percent): C, 77.1; H, 9.9.

As far as is known, this compound is not described in the literature.

Step E.—5-pyrrolidyl-13β-ethyl - 17α - methyl-des A-Δ$^{5(10),9(11)}$-gonadiene 17β-ol: The product of Step D was dissolved in 75 cc. of methanol under a nitrogen atmosphere and after heating to 50° C., 3 cc. of pyrrolidine diluted with 3 cc. of methanol was slowly added over 15 minutes. The reaction mixture was stirred at 50° C. for 40 minutes and then evaporated to a small volume and ice cooled and filtered. The precipitate was washed with methanol, with petroleum ether and dried to obtain 7.6 gm. of 5-pyrrolidyl - 13β - ethyl-17α-methyl-des A-Δ$^{5(10),9(11)}$-gonadiene-17β-ol appearing as pale yellow flakes not very stable in air.

Step F.—10 - hydroxymethylene-13β-ethyl-17α-methyl-des A-Δ$^{9(11)}$-gonaene-17β-ol-5-one: The product of Step E was dissolved in a mixture of 46 cc. of anhydrous dioxane, 23 cc. of anhydrous tetrahydrofuran and 3.2 cc. of triethylamine and after cooling the mixture to 5° C., 8.5 cc. of acetoformic acids anhydride was added and the mixture stirred for 3½ hours at this temperature. After adding 25 cc. of water to the reaction mixture, the mixture was stirred at room temperature overnight, then poured into ice water and extracted with ether. The ether phase was washed with water and then extracted with a mixture of ice and N sodium hydroxide. The alkaline phases were combined, acidified with concentrated hydrochloric acid and extracted with methylenechloride. The methylene chloride extract was dried and distilled to dryness to obtain 4.7 gm. of 10-hydroxymethylene - 13β - ethyl-17α-methyl-des A-Δ$^{9(11)}$-gonaene-17β-ol-5-one in the form of an oil which was used as is for the next step.

As far as is known, this compound is not described in the literature.

Step G—10-formyl-13β-ethyl-17α - methyl-des-A-Δ$^{9,11}$-gonadiene-17β-ol-5-one: 4.7 gm. of 10-hydroxyethylene-13β - ethyl-17α-methyl-des A-Δ$^{9(11)}$-gonaene-17β-ol-5-one were dissolved in a mixture of 23 cc. of anhydrous dioxane, and 23 cc. of anhydrous ether and after cooling the solution to 10° C., 3.4 gm. of 2,3-dichloro-5,6-dicyano-p-benzoquinone in 34 cc. of dioxane was slowly added thereto. The reaction mixture was stirred for 1½ hour at room temperature and then poured into a mixture of water and ice. After the addition of an excess of sodium bicarbonate and 2.5 cc. of 28° Bé. sodium bisulfite, the mixture was extracted with ether. The ether extracts were washed with iced very dilute sodium hydroxide, with water, dried and evaporated to dryness. The residue was chromatographed on alumina and eluted with methylene chloride to obtain 1.6 gm. of 10-formyl-13β-ethyl-17α-methyl-des A-Δ$^{9,11}$-gonadiene-17β-ol-5-one. The product occurred as a yellow oil which was used as such.

As far as is known, this compound is not described in the literature.

Step H — 10-hydroxymethyl-13β-ethyl-17α-methyl-des A-Δ$^{9,11}$-gonadiene-17β-ol-5-one: The product of Step G was dissolved in 16 cc. of dioxane and after the addition of 1.6 cc. of water, the reaction mixture was cooled slightly and 69 mg. of sodium borohydride were added thereto. The reaction mixture was stirred for 1 hour at 6° C. and then poured into a mixture of ice and water and extracted with methylene chloride. The extracts were washed with water, dried over sodium sulfate and evaporated to dryness. The residue was chromatographed on alumina and eluted with methylene chloride containing 2% methanol to obtain 1.2 gm. of 10-hydroxymethyl-13β-ethyl-17α-methyl-des A-Δ$^{9,11}$-gonadiene-17β-ol-5-one in the form of a pale yellow oil which was used as such. As far as is known, this compound is not described in the literature.

Step I — 2-oxa-13β-ethyl-17α-methyl-Δ$^{4,9,11}$-gonatriene-17β-ol-3-one (a) 1.2 gm. of 10-hydroxymethyl-13β-ethyl-17α-methyl-des A-Δ$^{9,11}$-gonadiene-17β-ol-5-one was dissolved in 60 cc. of anhydrous ether and 1.2 cc. of dihydropyran and 36 mg. of p-toluene sulfonic acid were added thereto. The mixture was stirred at room temperature for 7 hours and after the addition of 1.2 cc. of dihydropyran, stirring was continued for another 16 hours. The mixture was then poured into water and extracted with methylene chloride. The extracts were washed with an aqueous sodium bicarbonate solution, with water, dried over sodium sulfate and evaporated to dryness to obtain 2 gm. of 10-tetrahydropyranyloxymethyl - 13β-ethyl-17α-methyl-17β-tetrahydropyranyloxy-des A-Δ$^{9,11}$-gonadiene-5-one.

(b) 2 gm. of the said tetrahydropyranyloxy compound were dissolved in 24 cc. of anhydrous tetrahydrofuran and after adding 24 cc. of 0.86 mole of the zinc derivative of ethyl bromoacetate in dimethoxymethane thereto, the reaction mixture was heated to reflux for three hours. After cooling, the mixture was poured into ice water and acidifier with 2 N hydrochloric acid. The mixture was extracted with methylene chloride and the extracts were dried over sodium sulfate and distilled to dryness to obtain an oil residue which is 5-carbethoxymethyl-10-tetrahydropyranyloxymethyl - 13β-ethyl-17α-methyl-17β-tetrahydropyranyloxy-des A-Δ$^{9,11}$ - gonadiene-5-ol which was used as is for the next step.

(c) The said 5-carbethoxymethyl derivative was dissolved in 12 cc. of acetic acid and 1.2 cc. of 2 N hydrochloric acid and the solution was allowed to stand at room temperature for 40 hours. The reaction mixture was poured into a mixture of ice and water and was then extracted with methylene chloride. The organic extracts were washed with water, with a sodium bicarbonate solution, then with water, dried and evaporated to dryness. The residue was crystallized from benzene to obtain 450 mg. of 2-oxa-13β-ethyl-17α-methyl-Δ$^{4,9,11}$-gonatriene-17β-ol-3-one having a melting point of first 135° C. and then 162° C.

The mother waters were distilled and the residue was chromatographed on alumina with elution with benzene and then ether and 150 mg. of the said product melting at 135° C. and 162° C. was recovered from the ethereal phases. The two products were combined, dissolved in acetone, the solution was treated with carbon black-alumina mixture and the product was recrystallized from acetone-isopropyl ether mixture to obtain pale yellow prismatic crystals of 2-oxa-13β-ethyl-17α-methyl-Δ$^{4,9,11}$-gonatriene-17β-ol-3-one having melting points of 150° C. and 164° C. and a specific rotation $[\alpha]_D^{20}=-46°\pm2°$ (c.=0.7% in chloroform).

Analysis.—$C_{19}H_{24}O_3$; molecular weight=300.38. Calculated (percent): C, 7597; H, 8.05. Found (percent): C, 76.0; H, 8.0.

U.V. Spectrum:

$\lambda_{max.}$ at 230 m$\mu$ $E_{1cm.}^{1\%}=186$ $\epsilon=5,580$ $\lambda_{max.}$ at 328–329 m$\mu$ $E_{1cm.}^{1\%}=940$ $\epsilon=28,200$ As far as is known, this compound is not described in the literature.

PHARMACOLOGICAL DATA

Androgenic and Anabolic Activity

The tests were effected according to the Hershberger technique (Proc. Soc. Exp. Biol. Med., 1953, 83, 175) slightly modified. This consists of a daily administration of the compound studied to male rats castrated at the age of 3½ weeks. The rats were treated the next day after the castration for a period of 10 days except on Sunday, then sacrificed the eleventh day, 22 to 26 hours after the last administration. The animals were autopsied after the sacrifice and the organs of interest were separated and weighed, in particular the lifter muscle of the anus (Levator ani) in order to study the myotrophic and anabolic action as well as the ventral prostate and the seminal vesicles in order to study the simultaneous androgenic effect. When administered subcutaneously, the products were dissolved in olive oil containing 5% benzyl alcohol and when administered orally, the products were dissolved in olive oil. The dosages were divided into 9 administrations over 10 days. The results are reported in the following tables.

TABLE I.—10 DAY ORAL ADMINISTRATION

| Lots | Dosage | Fresh Levator ani in mg. | Seminal vesicles in mg. | Prostate in mg. |
|---|---|---|---|---|
| Control | 0 | 20.6 | 5.2 | 7.0 |
| 2-oxa-13$\beta$-ethyl-17$\alpha$-methyl-$\Delta^{4,9,11}$-gonatriene-17$\beta$-ol-3-one | 5$\gamma$×10 | 34.7 | 28.6 | 47.3 |
| | 9 | | | |
| | 25$\gamma$×10 | 42.1 | 42.1 | 61.3 |
| | 9 | | | |
| | 125$\gamma$×10 | 58.2 | 78.8 | 88.0 |
| | 9 | | | |
| 17$\alpha$-methyl-$\Delta^{4,9,11}$-estratriene-17$\beta$-ol-3-one | 10$\gamma$×10 | 32.9 | 15.4 | 29.5 |
| | 9 | | | |
| | 50$\gamma$×10 | 40.0 | 50.8 | 63.2 |
| | 9 | | | |
| | 250$\gamma$×10 | 59.0 | 102.9 | 94.3 |
| | 9 | | | |
| Control | 0 | 24.1 | 4.8 | 8.4 |
| 2-oxa-17$\alpha$-methyl-$\Delta^{4,9,11}$-estratriene-17$\beta$-ol-3-one | 10$\gamma$×10 | 50.8 | 47.7 | 71.2 |
| | 9 | | | |
| | 100$\gamma$×10 | 66.4 | 136.6 | 118.3 |
| | 9 | | | |
| 17$\alpha$-methyl-$\Delta^{4,9,11}$-estratriene-17$\beta$-ol-3-one | 10$\gamma$×10 | 35.4 | 17.0 | 34.2 |
| | 9 | | | |
| | 100$\gamma$×10 | 63.7 | 67.6 | 94.6 |
| | 9 | | | |

TABLE II.—7 DAY ORAL ADMINISTRATION

| Lots | Dosage | Fresh Levator ani in mg. | Seminal vesicles in mg. | Prostate in mg. |
|---|---|---|---|---|
| Control | 0 | 13.1 | 4.8 | 9.0 |
| 2-oxa-17$\alpha$-methyl-$\Delta^{4,9,11}$-estratriene-17$\beta$-ol-3-one | 2$\gamma$ | 25.9 | 17.6 | 29.3 |
| | 10$\gamma$ | 39.3 | 40.6 | 55.0 |
| | 50$\gamma$ | 39.2 | 64.5 | 70.8 |
| 17$\alpha$-methyl-$\Delta^{4,9,11}$-estratriene-17$\beta$-ol-3-one | 10$\gamma$ | 27.9 | 18.2 | 30.8 |
| | 50$\gamma$ | 32.7 | 33.6 | 58.1 |
| | 250$\gamma$ | 32.8 | 66.5 | 77.6 |

TABLE III.—10 DAY SUBCUTANEOUS ADMINISTRATION

| Lots | Dosage | Fresh Levator ani in mg. | Seminal vesicles in mg. | Prostate in mg. |
|---|---|---|---|---|
| Control | 0 | 18.5 | 8.2 | 14.2 |
| | 2$\gamma$×10 | 33.6 | 12.7 | 16.0 |
| | 9 | | | |
| 2-oxa-13$\beta$-ethyl-17$\alpha$-methyl-$\Delta^{4,9,11}$-gonatriene-17$\beta$-ol-3-one | 10$\gamma$×10 | 47.4 | 19.2 | 23.4 |
| | 9 | | | |
| | 50$\gamma$×10 | 44.5 | 37.1 | 37.1 |
| | 9 | | | |
| 17$\beta$-acetoxy-$\Delta^{4,9,11}$-estratriene-3-one | 10$\gamma$×10 | 36.9 | 10.8 | 11.8 |
| | 9 | | | |
| | 50$\gamma$×10 | 45.4 | 21.0 | 15.0 |
| | 9 | | | |
| | 250$\gamma$×10 | 56.1 | 51.8 | 36.1 |
| | 9 | | | |
| Control | 0 | 15.4 | 4.8 | 10.4 |
| 2-oxa-17$\alpha$-methyl-$\Delta^{4,9,11}$-estratriene-17$\beta$-ol-3-one | 10$\gamma$×10 | 49.8 | 42.9 | 56.4 |
| | 9 | | | |
| | 100$\gamma$×10 | 62.5 | 145.4 | 149.2 |
| | 9 | | | |
| 17$\beta$-acetoxy-$\Delta^{4,9,11}$-estratriene-3-one | 10$\gamma$×10 | 37.1 | 23.4 | 26.1 |
| | 9 | | | |
| | 100$\gamma$×10 | 55.5 | 76.7 | 79.6 |
| | 9 | | | |
| Control | 0 | 21.2 | 9.8 | 12.5 |
| 2-oxa-17$\alpha$-methyl-$\Delta^{4,9,11}$-estratriene-17$\beta$-ol-3-one | 1$\gamma$×10 | 30.8 | 10.7 | 25.3 |
| | 9 | | | |
| | 10$\gamma$×10 | 47.3 | 50.8 | 67.0 |
| | 9 | | | |
| 17$\beta$-acetoxy-$\Delta^{4,9,11}$-estratriene-3-one | 10$\gamma$×10 | 37.4 | 22.7 | 36.7 |
| | 9 | | | |
| | 100$\gamma$×10 | 53.1 | 84.6 | 77.1 |
| | 9 | | | |

The above tables show that the compounds of the invention possess remarkable anabolic and androgenic activity. In the Hershberger test, 2-oxa-17$\alpha$-methyl-$\Delta^{4,9,11}$-estratriene-17$\beta$-ol-3-one is active at 1$\gamma$ subcutaneously and 2$\gamma$ orally, which is about 10 times the subcutaneous activity of 17$\beta$-acetoxy-$\Delta^{4,9,11}$-estratriene-3-one and 5 times the oral activity of 17$\alpha$-methyl-$\Delta^{4,9,11}$-estratriene-17$\beta$-ol-3-one. The oral activity of 2-oxa-13$\beta$-ethyl-17$\alpha$-methyl-$\Delta^{4,9,11}$-gonatriene-17$\beta$-ol-3-one is about twice that of 17$\alpha$-methyl-$\Delta^{4,9,11}$-estratriene-17$\beta$-ol-3-one and its subcutaneous activity is about 5 times that of 17$\beta$-acetoxy-$\Delta^{4,9,11}$-estratriene-3-one.

Various modifications of the compositions and method of the invention may be made without departing from the spirit or scope thereof.

We claim:
1. 2-oxa-13$\beta$-ethyl - 17$\alpha$-methyl $\Delta^{4,9,11}$-gonatriene-17$\beta$-ol-3-one.

2. A process for the preparation of a compound of the formula

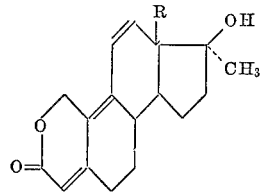

wherein R is selected from the group consisting of methyl and ethyl which comprises oxidizing 13β-R-des A-Δ⁹-gonaene-17β-ol-5-one where R has the above definition to form 13β-R-des A-Δ⁹-gonaene-5,17-dione, reacting the latter with a secondary amine of the formula

wherein $R_1$ and $R_2$ are alkyl of 1 to 6 carbon atoms and together with the nitrogen atom to which they are attached form a heterocyclic ring which may contain an additional nitrogen or oxygen heteroatom to form the corresponding 5 - enamino - 13β-R - des A - $\Delta^{5(10),9(11)}$ - gonadiene - 17 - one, reacting the latter with a methylating agent to form the corresponding 5-enamino-13β-R-17α-methyl-des A$\Delta^{5(10),9(11)}$-gonadiene-17β-ol, reacting the latter with acetoformic mixed anhydride to form 10-hydroxymethylene-13β-R-17α-methyl-des A-$\Delta^{9(11)}$-gonaene-17β-ol-5-one, dehydrogenating the latter with a substituted p-benzoquinone to form the corresponding 10-formyl-13β-R-17α-methyl-des A$\Delta^{9,11}$-gonadiene-17β-ol-5-one, reducing the latter with an alkali metal borohydride to form the corresponding 10-hydroxymethyl-13β-R-17α-methyl-des A-$\Delta^{9,11}$-gonadiene-17β-ol-5-one, reacting the latter with dihydropyran to form 10-tetrahydropyranyloxymethyl-13β-R-17α-methyl-17β - tetrahydropyranyloxy-des A$\Delta^{9,11}$-gonadiene - 5-one subjecting the latter the Reformatzky reaction with ethyl bromoacetate to form 5-carbethoxymethyl-10-tetrahydropyranyloxymethyl-13β-R-17α-methyl - 17β-tetrahydropyranyloxy-des A$\Delta^{9,11}$-gonadiene-5-ol and subjecting the latter to acid treatment to form 2-oxa-13β-R-17α-methyl-$\Delta^{4,9,11}$-gonatriene-17β-ol-3-one.

3. The process of claim 2 wherein the oxidation is effected with a sulfo-chromic acid mixture in acetone.

4. The process of claim 2 wherein the secondary amine is selected from the group consisting of morpholine, pyrrolidine and piperidine.

5. The process of claim 2 wherein the methylating agent is selected from the group consisting of methyl lithium, methyl magnesium bromide, methyl magnesium chloride and methyl magnesium iodide.

6. The process of claim 2 wherein the dehydrogenation is effected with a dihalo-dicyano-p-benzoquinone.

7. The process of claim 2 wherein 10-hydroxymethyl-13β-R-17α-methyl-des A-$\Delta^{9,11}$-gonadiene-17β-ol-5-one is reacted with dihydropyran in ether in the presence of an acid catalyst.

8. The process of claim 2 wherein the Reformatzky reaction is effected in a mixture of dimethoxymethane and tetrahydropyran.

9. The process of claim 2 wherein the hydrolysis is effected with a mixture of hydrochloric acid and acetic acid.

10. A process for the preparation of 2-oxa-17α-methyl-17β-(2'-tetrahydropyranyl)-oxy-$\Delta^{4,9,11}$-estratriene - 3-one which comprises reacting des A-Δ⁹-estraene-5,17-dione with cyclic secondary amine to form the corresponding 5-enamino compound, reacting the latter with methyl lithium to form the corresponding 5-enamino-17α-methyl-des A-$\Delta^{5(10),9(11)}$-estradiene-17β-ol, reacting the latter with acetic acid-formic acid mixed anhydride to form 10-hydroxymethylene-17α - methyl-des A-$\Delta^{9(11)}$-estraene-17β-ol-5-one, dehydrogenating the latter with a dihalodicyano-p-benzoquinone to form 10-formyl-17α-methyl-des A-$\Delta^{9,11}$-estradiene-17β-ol-5-one, reducing the latter with an alkali metal borohydride to form 10-hydroxymethyl-17α-methyl-des A-$\Delta^{9,11}$-estradiene - 17β-ol-5-one, reacting the latter with dihydropyran to form 10-tetrahydropyranyloxymethyl - 17α - methyl - 17β - tetrahydropyranloxy - des A - $\Delta^{9,11}$-estradiene-5-one, subjecting the latter to the Reformatzky reaction with ethyl bromoacetate to form 5ξ-carbethoxymethyl-10-tetrahydropyranyloxymethyl - 17α - methyl - 17β-tetrahydropyranyloxy-des A-$\Delta^{9,11}$-estradiene-5ξ-ol, treating the latter with acid to form 2-oxa-17α-methyl-$\Delta^{4,9,11}$-estratriene-17β-ol-3-one and reacting the latter with dihydropyran in the presence of p-toluene sulfonic acid to form 2-oxa-17α-methyl-17β-(2'ξ - tetrahydropyranyl)oxy-$\Delta^{4,9,11}$-estratriene-3-one.

11. A process for the preparation of the compound of claim 1 which comprises oxidizing 13β-ethyl-des A-Δ⁹-gonaene-17β-ol-5-one with a sulfo-chromic acid mixture to form 13β-ethyl-des A-Δ⁹-gonaene-5,17-dione, reacting the latter with a secondary amine to form the corresponding 5-enamino-13β-ethyl-des A-Δ⁹-gonaene-17-one, reacting the latter with a methylating agent to form the corresponding 5-enamino-13β-ethyl-17α-methyl-des A-$\Delta^{5(10),9(11)}$-gonadiene-17β-ol, reacting the latter with mixed acetic acid-formic acid anhydride to form 10-hydroxymethylene-13β - ethyl-17α - methyl-des A-$\Delta^{9(11)}$-gonaene-17β-ol-5-one, dehydrogenating the latter with a dihalo-dicyano-p-benzoquinone to form 10-formyl-13β-ethyl-17α-methyl-des A-$\Delta^{9,11}$-gonadiene-17β-ol-5-one, reducing the latter with an alkali metal borohydride to form 10-hydroxymethyl-13β-ethyl-17α-methyl-des A-$\Delta^{9,11}$-gonadiene-17β-ol-5-one, reacting the latter with dihydropyran to form 10-tetrahydropyranyloxymethyl - 13β - ethyl-17α-methyl-17β-tetrahydropyranyloxy-des A-$\Delta^{9,11}$-gonadiene-5-one, subjecting the latter to the Reformatzky reaction with ethyl bromoacetate to form 5-carbethoxymethyl-10-tetrahydropyranyloxymethyl-13β - ethyl-17α-methyl-17β-tetrahydropyranyloxy-des A-$\Delta^{9,11}$-gonadiene-5-ol and cyclizing the latter under acid conditions to form the compound of claim 4.

References Cited

UNITED STATES PATENTS 3,405,141  10/1968  Pappo et al. _____ 260—343.2

JOHN M. FORD, Primary Examiner

U.S. Cl. X.R.

260—586, 563; 424—279